Nov. 12, 1963     B. STERNLICHT     3,110,525
COMBINED JOURNAL AND THRUST BEARING
Filed Nov. 1, 1960     2 Sheets-Sheet 2
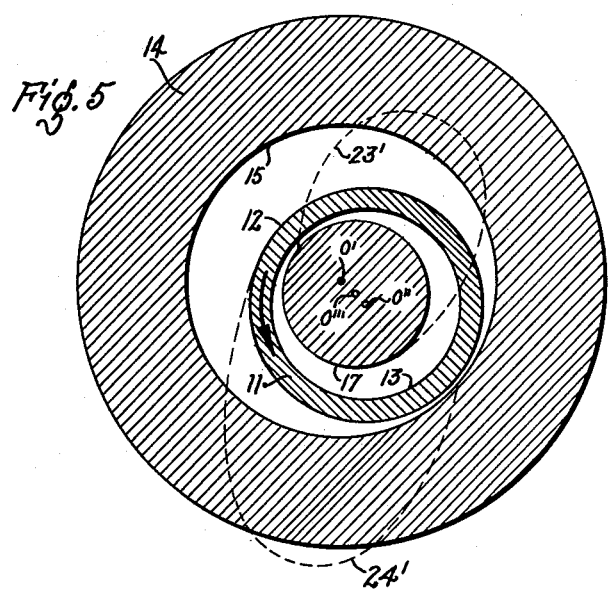
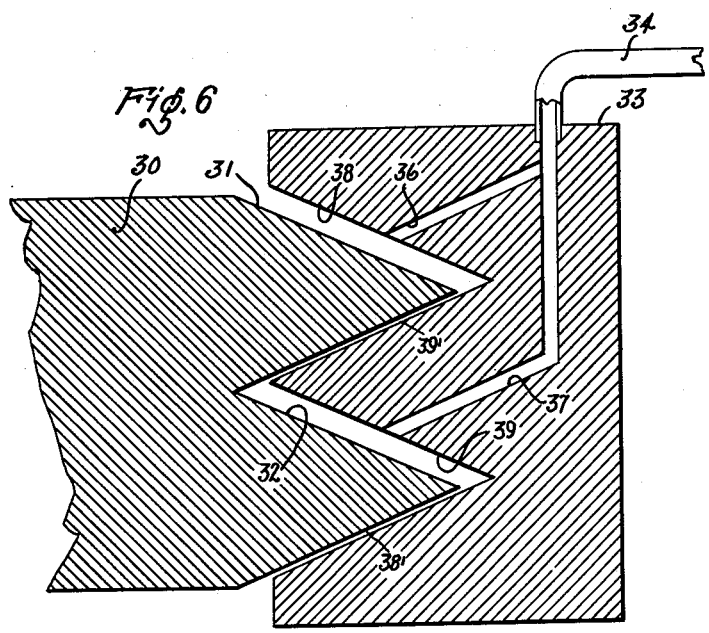
Inventor
Beno Sternlicht
by Alfons G. Hutter
His Attorney.

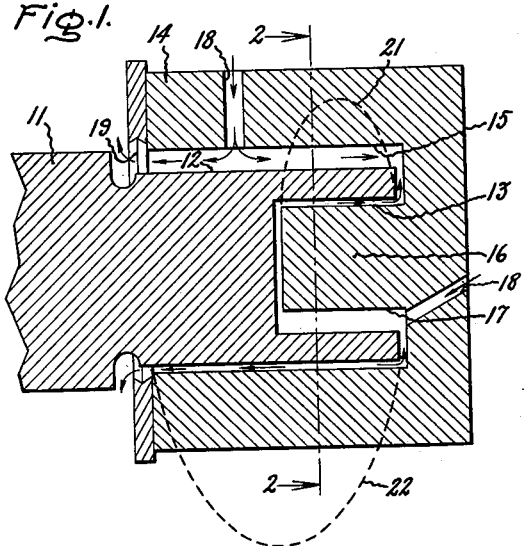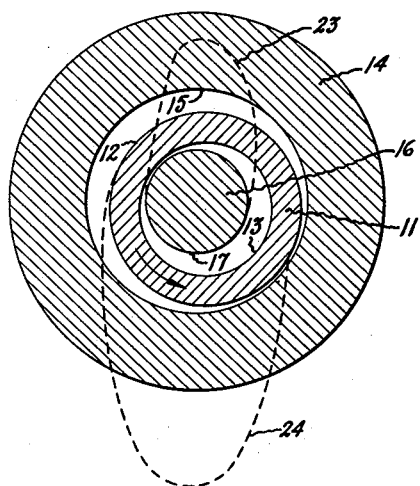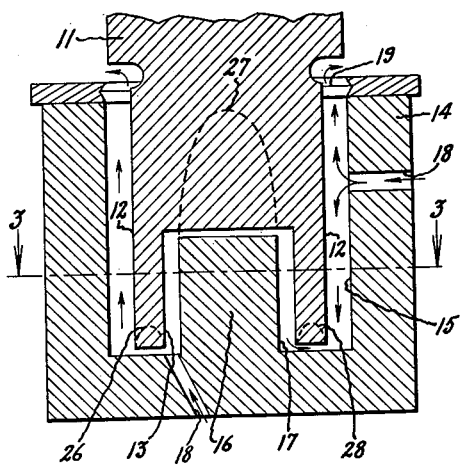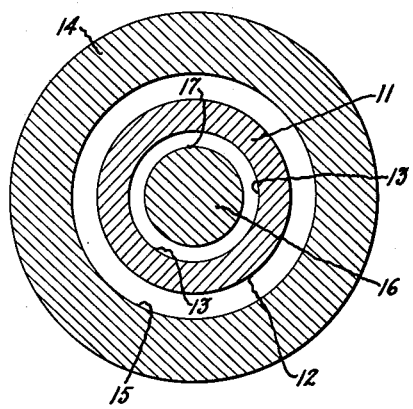

United States Patent Office 3,110,525
Patented Nov. 12, 1963

3,110,525
COMBINED JOURNAL AND THRUST BEARING
Beno Sternlicht, Schenectady, N.Y., assignor to General
Electric Company, a corporation of New York
Filed Nov. 1, 1960, Ser. No. 66,611
6 Claims. (Cl. 308—9)

The present invention relates to a new and improved bearing. More particularly, the invention relates to a combination journal and thrust bearing having a relatively large load-carrying capacity for its size. This application is a continuation-in-part of my copending application, Serial No. 725,200, filed March 31, 1958, now abandoned.

With the increase in use of portable electric tools, portable appliances, and other similar devices where it is desired to obtain the largest possible work benefit from a light-weight device, the need for improved bearing constructions having relatively large load-carrying capacities for their size has become more pressing. New applications for bearings are also being presented wherein bearings utilizing low supply pressure lubricant films require large load-carrying areas to support the bearing load. Such a situation exists in gyroscope applications where it is desired to use ambient pressure gases to hydrodynamically support gyroscope spin axis. As a further requirement, it is desirable that the improved bearing constructions be capable of withstanding both radial and thrust loading conditions.

It is, therefore, one object of the present invention to provide a new and improved bearing having a relatively large load-carrying capacity for its size.

Another object of the invention is to provide a combination journal and thrust bearing having the above set forth characteristics.

A still further object of the invention is to provide bearings having large load-carrying areas to permit the use of low pressure lubricant films.

These and other objects of my invention may be more readily perceived from the following description.

In practicing the invention, the end of a shaft is provided with an external journal surface and an axial bore that has an internal journal surface which is coaxial and concentric with the external bearing surface. The shaft is journalled in a bearing housing which envelops the end of the shaft and has both internal and external bearing surfaces operating in load-carrying relationship with both the external and internal journal surfaces on the shaft.

Other objects, features, and many of the attendant advantages of this invention will be appreciated more readily as same becomes better understood by reference to the following detailed description when considered in connection with the accompanying drawings wherein like parts in each of the several figures are identified by the same reference character, and wherein:

FIGURE 1 is a sectional view of a combined journal and thrust bearing constructed in accordance with the invention and illustrates the same under radial loading conditions;

FIGURE 2 is a cross-sectional view of the construction shown in FIGURE 1 taken through plane 2—2;

FIGURE 3 is a sectional view of the combined journal and thrust bearing constructed in accordance with the invention and illustrates the same under thrust loading conditions with no radial load applied;

FIGURE 4 is a cross-sectional view of the bearing under the conditions shown in FIGURE 3 taken through plane 3—3;

FIGURE 5 is a sectional view of another embodiment of the invention; and

FIGURE 6 is a sectional view of a third embodiment of the invention taken through a plane parallel to the shaft axis.

In FIGURES 1 through 4 of the drawings there is shown a shaft 11, having an external circumferential journal surface 12 formed on one end thereof. Also formed in the shaft 11, on the same end at which the journal surface 12 is located, is a bore which has internal substantially cylindrical journal surface 13 that is coaxial and concentric with the external journal surface 12. This structure is rotatably supported and enveloped in a cup-shaped bearing housing having an outer cylindrical skirt portion 14 on which an internal cylindrical bearing surface 15 is formed which coacts in load-carrying relationship with the external journal surface 12 of shaft 11. The cup-shaped bearing housing also has an internally disposed post portion 16 which is disposed within the bore in the end of the shaft 11 and which has an external bearing surface 17 that coacts with the internal journal surface 13 on shaft 11 in load-carrying relationship. A fluid lubrication medium may be introduced into the bearing and shaft arrangement thus constructed through a passageway 18 in the circumferential skirt portion 14 of the cup-shaped bearing housing. Fluid lubricants thus introduced work their way through the bearing in a direction indicated by the arrows and leak out past the sealing ring 19.

Upon the bearing thus constructed being placed under load, axial and circumferential pressure profiles may develop hydrodynamically in the fluid lubrication medium introduced into the bearing in the manner illustrated by the dotted lines 21 and 22 in FIGURE 1, and 23 and 24 in FIGURE 2, respectively. As best seen in FIGURE 2 of the drawings when operating under radial loading conditions, the bearing portions of the bearing housing are offset somewhat from the journal portions of shaft 11 in accordance with well known hydrodynamic bearing theory, the eccentricity being an indication of bearing loading. Consequently, circumferential pressure profiles will develop in the fluid lubrication medium at points of compression on the external journal surface 12 of shaft 11 in the manner indicated by the dotted line 24. These circumferential pressure profiles extend axially along the length of the bearing in the manner indicated by the dotted lines 22 and 21 in FIGURE 1, respectively. From a consideration of FIGURES 1 and 2 of the drawings, it can be appreciated that the new and improved bearing structure described above provides the two concentric bearing surfaces with two different load-carrying regions of hydrodynamic pressure, thereby greatly increasing the load-carrying capacity of the bearing structure for its size. If desired, the number of concentric bearing surfaces which act as load-carrying converging regions which develop hydrodynamic pressure can be increased to n, where n is any value greater than 1, thereby greatly increasing the load-carrying capacity for any given length bearing. Furthermore, because of its construction it can be appreciated that the bearing is designed to take both radial and thrust loads. This fact can be further appreciated from a consideration of FIGURES 3 and 4 of the drawings.

FIGURES 3 and 4 of the drawings show the identical bearing structure illustrated in FIGURES 1 and 2 under straight axial thrust loading conditions. Under these conditions, axial pressure profiles are developed in the fluid lubrication medium at the ends of the shaft 11 and the bottom of core therein as indicated by the dotted lines at 26, 27, and 28. In the event that a combined radial and thrust load is applied to the shaft 11, the shaft deflects both to one side in the manner indicated in FIGURES 1 and 2 of the drawing and against the end of the bearing housing in the manner of FIGURES 3 and 4 so that both circumferential and axial pressure profiles develop.

In FIGURE 5 there is shown a second embodiment of the invention in which, journal surfaces 12 and 13 of shaft 11 are maintained concentric with the bearing center at 0" which is also the center of rotation. Bearing surfaces are not maintained concentric in this embodiment, surface 15 having its center at 0' and surface 17 having its center at 0'''. Because the bearing surfaces are eccentric, the load-carrying capacity of the bearing construction may be modified to accommodate a wide range of loads.

It is well known that hydrodynamic bearings generate high pressure lubricant films for support purposes as a result of the eccentricity of the bearing surface with respect to the rotating journal surface. When the area between the journal and bearing converges in the direction of rotation of the shaft, a positive pressure is generated as illustrated by dotted lines 23' and 24' shown in FIGURE 5. Similarly, it is well known that in areas of divergence, that is, where the space between the bearing and journal widens in the direction of rotation, a diffusion action occurs generating negative pressures. From this it can be seen that by judiciously locating the centers 0', 0", and 0''', the pressure profiles 23' and 24' can be located in a manner to meet a specific critical load condition. In an extreme condition, the centers 0', 0", and 0''' can be located in a straight line in which case the areas of convergence will be located on one side of the line defined by points 0', 0", and 0''', giving high load-carrying properties to one side of the bearing construction.

FIGURE 6 illustrates another embodiment of the invention in which conical bearing surfaces are utilized to accommodate both radial and thrust loads. Shaft 30 at one end thereof has an outer conical journal surface 31 which is concentric with the conical bore which defines an inner conical journal surface 32. Shaft 30 may be supported in bearing block 33 having an outer conical bearing surface 38 adapted to engage journal surface 31 and an inner conical bearing surface 39 adapted to engage journal surface 32. In the embodiment in FIGURE 6 the shaft load is supported principally at areas 38' and 39'; lubricant is preferably supplied at the unloaded areas. Such lubricant may be supplied through line 34 which is in communication with the bearing surfaces through lines 36 and 37. If desired, the bearing surfaces 38 and 39 may be eccentric in a manner similar to the construction illustrated in FIGURE 5.

Because of the conical configurations, the bearing construction provides support in both radial and axial directions. If desired, the bearing may be made isoelastic by suitably selecting the cone angles to give the bearing equal stiffness in the axial and radial directions. Another advantage of this construction is that the bearing is adjustable in that the bearing block may be moved axially relative to the shaft to vary the clearances at 38' and 39' and thereby affect the load carrying capacity of the construction.

Accordingly, it may be appreciated that the new and improved bearing structure devised by the applicant constitutes a combined journal and thrust bearing which may function hydrodynamically or hydrostatically and is capable of operating under axial and radial loading. Further, by reason of its unique construction wherein a plurality of bearing surfaces are provided, the load-carrying capacity for a given length bearing is greatly increased, hence, making it possible to design relatively small bearings having large load-carrying capacities to meet the particular requirements. Further reduction in the size of the bearing structure is accomplished by reason of making the cup-shaped bearing housing also serve as a seal for the fluid lubrication medium introduced into the bearing.

Obviously, other modifications and variations of the present invention are possible in the light of the above teachings. It is, therefore, to be understood that the changes being made in the particular embodiment of the invention described are within the full intended scope of the invention as defined by the appended claims.

What I claim is new and desire to secure by Letters Patent of the United States is:

1. In combination, a shaft having a pair of annular journal surfaces, one journal surface at least partially enveloping a portion of the second journal surface, a bearing having a cavity with bearing surfaces located therein operatively coacting with the journal surfaces, thrust bearing means being located in said bearing cavity and coacting with the bearing surfaces, said thrust bearing means having a surface area at least as large as the cross-sectional area of the shaft, and means for hydrodynamically supporting the shaft in the bearing.

2. The combination as defined in claim 1 wherein:
   (a) said annular journal surfaces are concentric, and
   (b) said bearing surfaces are annular and eccentric of one another.

3. In combination, a shaft having a pair of annular journal surfaces, one journal surface being substantially enveloped by the second journal surface, a bearing block having a cavity with two substantially cylindrical bearing surfaces located therein to be operatively associated with the journal surfaces of the shaft, a pair of thrust bearing surfaces located in the cavity of the bearing, the area of the thrust bearing surfaces being substantially equal to the cross-sectional area of the shaft.

4. A bearing comprising an inner annular bearing surface, an outer cylindrical bearing surface enveloping the inner annular bearing surface and thrust bearing means having a surface area at least substantially equal to the cross-sectional area of a shaft, said shaft having a diameter substantially that of the diameter of the outer cylindrical bearing surface.

5. The bearing according to claim 4 in which the bearing surfaces are eccentric.

6. In combination, a shaft having an external circumferential bearing surface at one end thereof and having a bore in the end thereof which is coaxial and concentric with said bearing surface and which has an internal bearing surface, a cup-shaped bearing housing for journalling said shaft having an outer circumferential skirt portion with an internal circumferential bearing surface that directly coacts with the external circumferential bearing surface on said shaft in load-carrying relationship, and having post portion disposed in the bore in the end of the shaft that has a continuous external bearing surface which directly coacts with the internal bearing surface on the shaft in load-carrying relation, the outer circumferential skirt portion of said cup-shaped bearing housing having a sealing ring forming a part of the end portion thereof for sealing in lubrication medium between said shaft and the bearing housing, and a source of fluid lubrication medium connected intermediate said bearing surfaces at points where no pressure profile develops whereby fluid lubrication medium is introduced between said coacting bearing surfaces and upon rotation of the shaft under load, circumferential pressure profiles develop in said medium about both the internal and external bearing surfaces of the shaft with the pressures being maximum at opposite sides of the center of the shaft in the reverse of the loading direction.

References Cited in the file of this patent

UNITED STATES PATENTS

| | | |
|---|---|---|
| 463,538 | McCully | Nov. 17, 1891 |
| 1,337,742 | Abbott | Apr. 20, 1920 |
| 2,488,825 | Palumbo | Nov. 22, 1949 |
| 2,617,668 | Stewart | Nov. 11, 1952 |